(12) United States Patent
Bailin et al.

(10) Patent No.: US 9,171,260 B2
(45) Date of Patent: Oct. 27, 2015

(54) METHOD AND SYSTEM FOR CONFIGURING RULES FOR EXECUTION

(71) Applicants: Sidney Bailin, Washington, DC (US); Ian Klein, Hatfield (GB); David Witten, Arlington, VA (US)

(72) Inventors: Sidney Bailin, Washington, DC (US); Ian Klein, Hatfield (GB); David Witten, Arlington, VA (US)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/330,439

(22) Filed: Jul. 14, 2014

(65) Prior Publication Data

US 2014/0372352 A1    Dec. 18, 2014

Related U.S. Application Data

(63) Continuation of application No. 12/883,879, filed on Sep. 16, 2010, now Pat. No. 8,805,765.

(60) Provisional application No. 61/352,619, filed on Jun. 8, 2010.

(51) Int. Cl.
| | |
|---|---|
| *G06N 5/04* | (2006.01) |
| *G06N 5/02* | (2006.01) |
| *G06Q 30/04* | (2012.01) |
| *G06F 17/00* | (2006.01) |
| *G06F 17/30* | (2006.01) |
| *G06N 5/00* | (2006.01) |
| *G06Q 10/06* | (2012.01) |

(52) U.S. Cl.
CPC ............... *G06N 5/025* (2013.01); *G06F 17/00* (2013.01); *G06F 17/30507* (2013.01); *G06N 5/00* (2013.01); *G06N 5/04* (2013.01); *G06N 5/042* (2013.01); *G06N 5/046* (2013.01); *G06Q 30/04* (2013.01); *G06Q 10/06* (2013.01)

(58) Field of Classification Search
USPC .................................................. 706/47, 48
See application file for complete search history.

(56) References Cited

U.S. PATENT DOCUMENTS

| | | |
|---|---|---|
| 8,521,572 B2 | 8/2013 | Hanson et al. |
| 8,555,181 B2 | 10/2013 | Thorpe et al. |

OTHER PUBLICATIONS

Grosof, Representing E-Commerce Rules via Situated Courteous Logic Programs in RuleML [online], Nov. 23, 2003 [retrieved on Dec. 15, 2014]. Retrieved from the Internet:<URL: http://citeseerx.ist.psu.edu/viewdoc/download?doi=10.1.1.4.8913&rep=rep1&type=pdf.ps>.*

(Continued)

*Primary Examiner* — Jeffrey A Gaffin
*Assistant Examiner* — Nathan Brown, Jr.
(74) *Attorney, Agent, or Firm* — Finnegan, Henderson, Farabow, Garrett & Dunner, LLP

(57) ABSTRACT

Data-driven rules are eliminated from an application, and replaced with goal-driven rules that formally and completely characterize high-level business concepts, while enabling the resulting goal-driven rules to be executed eagerly using a forward chaining rule engine in a way that preserves the data-driven behavior of the original rules. A computer-implemented method for executing business rules provides a unified rule that encapsulates a goal-oriented rule with triggering information selected from dependencies of the goal-oriented rule. The unified rule may be eagerly executed in response to changes in data specified by the dependencies, or lazily executed in response to a request for the value computed by the rule.

20 Claims, 8 Drawing Sheets

(56) References Cited

OTHER PUBLICATIONS

Zhang, *JXPERT: A JAVA/XML-Based Intelligent Information System*, 2002, 58 pages, available at http:// http://cobweb.cs.uga.edu/~potter/dendrite/zhang_xin_ms.pdf.

Paschke et al., Rule Responder: RuleML-Based Agents for Distributed Collaboration on the Pragmatic Web, *2nd International Conference on the Pragmatic Web*, Tilburg. The Netherlands, Oct. 2007, 12 pages, available at http://ruleml.org/papers/RuleResponder.pdf.

* cited by examiner

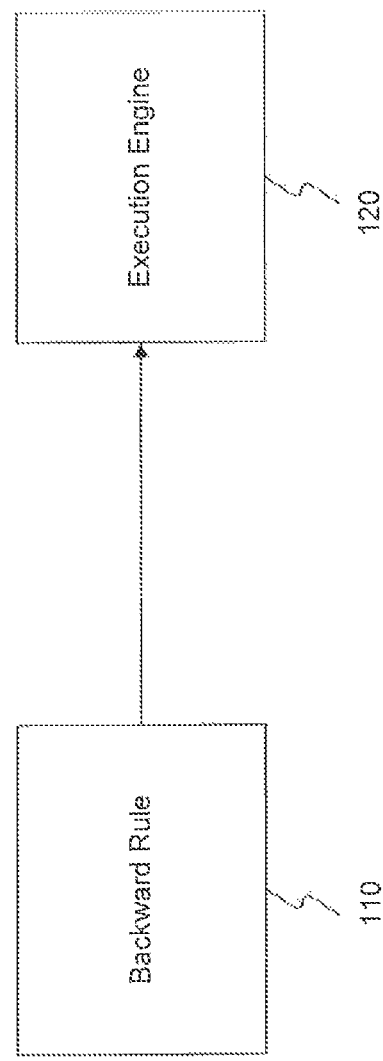

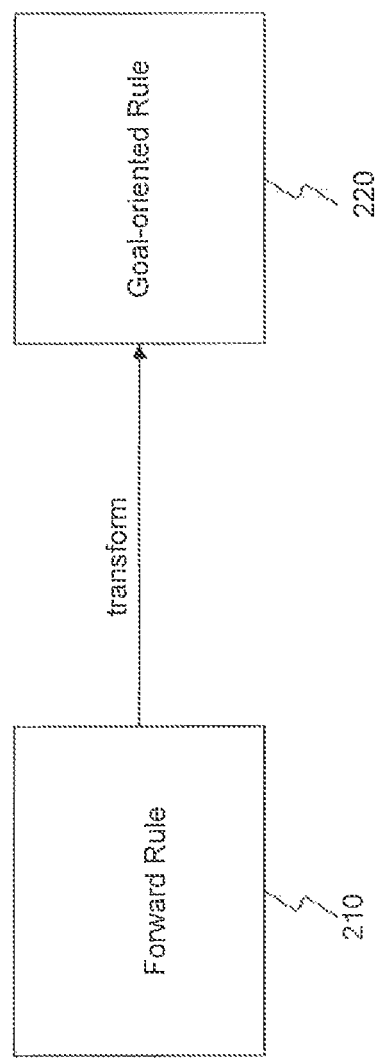

METHOD AND SYSTEM FOR CONFIGURING RULES FOR EXECUTION

RELATED APPLICATIONS

This application is a continuation application of U.S. patent application Ser. No. 12/883,879, filed Sep. 16, 2010, issued as U.S. Pat. No. 8,805,765, which claims the benefit of priority of U.S. Provisional Application No. 61/352,619, filed Jun. 8, 2010, entitled "Methods and Systems for Replacing Forward-Chaining Business Rules with Goal-Oriented Rules Executed by a Forward-Chaining Rule Engine," both of which are incorporated by reference in their entirety.

DESCRIPTION OF THE INVENTION

1. Field

This disclosure relates generally to computer systems that implement rules, and more particularly, to methods and systems for configuring rules for execution by an execution engine.

2. Background

In computer systems that implement a formalization of rules, languages (and the engines that execute them) are sometimes referred to as either: (1) forward-chained or data-driven rules (or engines), and (2) backward-chained or goal-driven rules (or engines).

Forward-Chained or Data-Driven Rules

Rules may be executed (e.g., using a known Rete based algorithm) in an "eager" fashion, which means that they are executed upon changes in the data on which the antecedents depend. Such changes may be caused by an external event, or by the consequent of some rule that has already been executed. Event-Condition-Action (ECA) rules fall into this category, because the occurrence of an event is represented as the appearance of some data object and this event causes a condition to trigger an action.

Backward-Chained or Goal-Driven Rules

Backward-chained or goal-driven rules are executed in a "lazy" fashion, which means that the goal of a rule is evaluated only when needed. The evaluation is performed in response to either an explicit request by some other part of the system, or to satisfy the antecedent of some other rule that is in the process of being executed.

It is often desirable to express rules in a goal-driven manner because the rule can encapsulate the entirety of the logic pertaining to a given concept. For example, a goal oriented rule can include virtually all aspects of a particular determination, such as the determination of a customer's credit worthiness. The reason for this is that a concept, to the extent that it is modeled in an information system, corresponds to a computational goal that is to compute a value for the concept, in this example, a value for a customer's credit worthiness.

In contrast, a data-driven rule, while it may be easy to understand on its own, encapsulates only a small part of the logic because it is situation-specific: it is saying, "When this happens, do this." In the customer credit worthiness example, a single part of the logic may be defined by the following logic statement: "when a customer's payment is late, flag the customer account."

In the field of rule-based applications, the set of data-driven rules quickly becomes large, complexly interrelated, and therefore difficult to understand as a whole and to maintain. Nevertheless, such systems are widely used, for two principal reasons: 1) the individual rules are enticingly easy to understand, while the complexities of the whole set of rules is often not perceived until the system has been implemented and is being maintained, and 2) "eager" execution allows immediate adaptation to changes in data, which is often necessary in an application. That is, when you need a value that has been computed by eager evaluation, you have it instantly, because it has already been computed.

SUMMARY

Methods and systems consistent with aspects of the present invention provide a way to transform data-driven rules into goal-driven rules, which may formally characterize high-level concepts, including business concepts like the determination of a creditworthiness of a customer, while enabling the resulting goal-driven rules to be executed eagerly using a forward chaining rule engine in a way that preserves the data-driven behavior of the original rules.

Methods and systems consistent with additional aspects of the present invention provide a way to author goal driven rules that completely characterize high-level concepts while being capable of execution by a forward chaining rule engine in a way that provides the required data-driven benefits.

BRIEF DESCRIPTION OF THE DRAWINGS

These and other aspects related to the present invention will become more apparent and more readily appreciated from the following detailed description of exemplary implementations, taken in conjunction with the accompanying drawings, of which:

FIG. 1 is a diagram of a backward-chaining rule and execution engine used to explain aspects of the present invention;

FIG. 2 is a diagram of forward-chaining rule transformation used to explain aspects of the present invention;

FIG. 3A is a diagram of a business rule with a dependency in accordance with one implementation consistent with the present invention. FIG. 3B is a diagram of a unified rule encapsulating a goal-oriented rule with triggering information selected from dependencies of the goal-oriented rule in accordance with one implementation consistent with the present invention;

DETAILED DESCRIPTION

When using backward-chained rules, a goal of the backward-chained rule is evaluated only when needed. For example, the goal may be evaluated either by explicit request by some other part of the system, or in order to satisfy the antecedent of some other rule that is in the process of being executed. By using backward-chained rules users may partition and simplify the logic of an application, which may be particularly beneficial when the application utilizes large or complex rule sets.

Reference will now be made in detail to exemplary aspects of the invention, examples of which are illustrated in the accompanying drawings. Wherever possible, the same reference numbers will be used throughout the drawings to refer to the same or like parts.

FIG. 1 is a simplified block diagram used to illustrate a backward-chaining rule and execution engine consistent with one implementation related to the present invention. As shown in FIG. 1, backward-chained rule 110 may be executed by execution engine 120. As an example, consider the following rule:

TO COMPUTE Customer.creditWorthiness DO:
IF Payment.date is more than 10 days late
THEN set Customer.creditWorthiness=POOR A data-driven (forward-chained) rule, in contrast, reacts to data changes. Its form is focused on the data change and the reactions to it. Thus, it may take the form:

WHEN some items of data have changed in a certain way
THEN change some other data in some way.

For example:
R1: WHEN payment date is more than 10 days late
   THEN set customer credit worthiness=POOR
R2: WHEN payment amount is less than amount due by more than 10%
   THEN
      IF customer credit worthiness is GOOD
      THEN set customer credit worthiness=FAIR
      ELSE set customer credit worthiness=POOR FIG. 2 is a simplified block diagram used to illustrate a forward-chaining rule transformation consistent with one implementation related to the present invention. As shown in FIG. 2. forward-chained rule 210 may be transformed into goal-oriented rule 220, as discussed in more detail below. Such a transformation may simplify rule sets and improve computer processing speed, for example by avoiding the so-called "Rete bottleneck." The resulting goal-driven rules may formally and completely characterize high-level business concepts, while enabling the resulting goal-driven rules to be executed eagerly using a forward chaining rule engine in a way that preserves the data-driven behavior of the original (i.e., data-driven) rules.

Figure 3B:
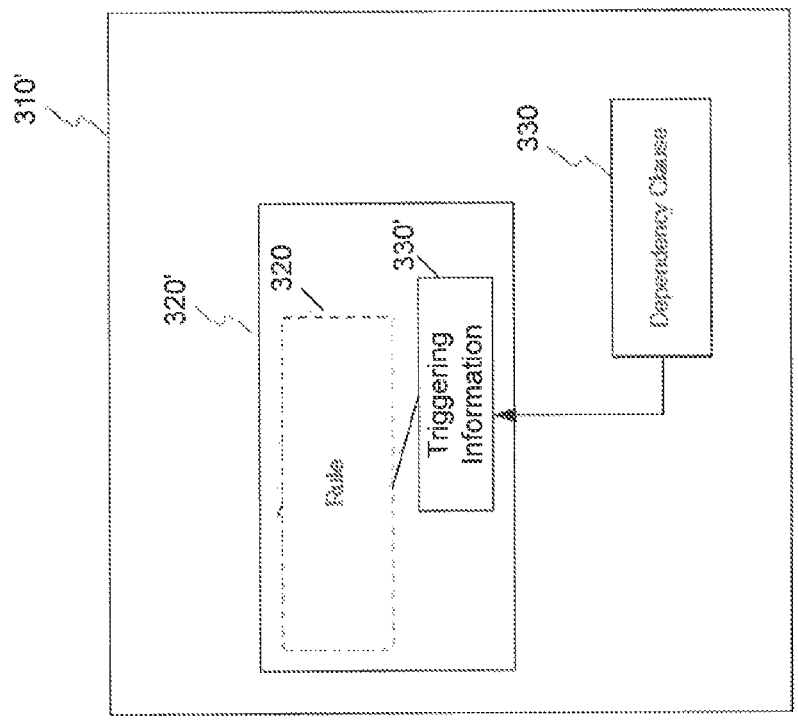
Figs. 3A-3B are diagrams of business rules consistent with the present invention.
Figure 3A:
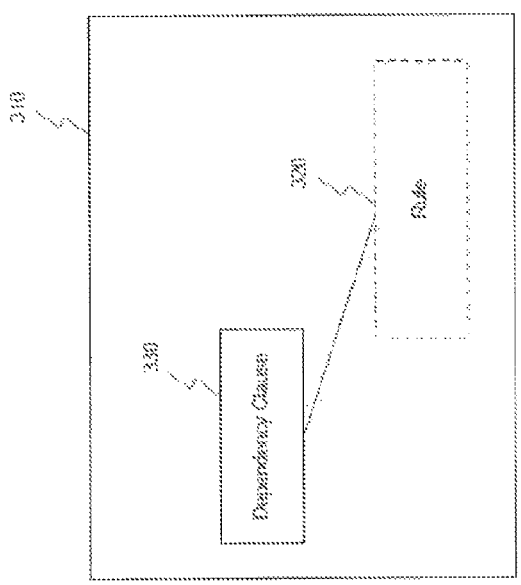

Turning to FIG. 3A, a diagram of a business rule with a dependency clause is shown. Rule 320 may include or be associated with dependency clause 330. For example,

```
rule PaymentDetails.timeliness
{
   if this. date within 2 days after customerBill.biiiDate
   then this.timeliness = "Early" ;
   else if this.date within 1 week after customerBill.biiiDate
   then this.timeliness = " OnTime" ;
   else this.timeliness = "Late" ;
}
```

This rule sets the attribute PaymentDetails.timeliness. It depends on PaymentDetails.date and PaymentDetails.customerBill.billDate. Rule 320 may be executed by a backward-chaining rule engine 310 or, in some cases, by a forward-chaining rule engine or a hybrid rule engine, such as the Jena engine, which may perform both forward and backward chaining.

As another example, the resulting goal-driven rules may enable the determination of business measures, such as a customer's status. Other examples may include: Customer.latestBills; Customer.observations; CustomerAccount.observations; CustomerBill.observations: Subscription.observations; AccountPaymentEvent.observations; ChargeDisputeEvent.observations; BillSentEvent.observations; AccountCollectionsEvent.observations; CustomerInteractionItemEvent.observations; Customer.isCancelledStatus; Customer.chumPropensity; Customer.recentInteractionCount; Customer.openProblemCount; Customer.closedProblemCount; Subscription.activePhone; Subscription.orderedPhone; Equipment.isInRemorsePeriod; Equipment.isInsured; Equipment.isUnderWarranty; Subscription.commitmentExpiredDate; Customer.commitmentExpiredDate; Customer.commitmentsExpired; Customer.usagePatternLow; Subscription.usagePatternLow; Subscription.usageDataLow; Subscription.usageVoiceLow; Subscription.usageTextLow; Subscription.lastUsageDate; Subscription.lastVoiceUsageDate; Subscription.lastTextUsageDate; Subscription.lastDataUsageDate; Subscription.deviceNoHeartbeatDate; Subscription.openProblemCount; Subscription.problemOpenDate; Subscription.problemOpenDataDate; Subscription.problemOpenTextDate; Subscription.problemOpenVoiceDate; Subscription.recentlyClosedProblemCount; Subscription.problemClosedDate; Subscription.problemClosedDataDate; Subscription.problemClosedTextDate; Subscription.problemClosedVoiceDate; Subscription.deviceActivationDate; Subscription.deviceExchangeDate; Subscription.deviceEligibleUpgradeDate; Subscription.deviceOrderedDate; Subscription.suspendedDate; Customerinteraction.subscriptions; CustomerInteractionItem.subscriptions; CustomerInteractionItem.classification; Subscription.deviceShoppingInteractionDate; Subscription.deviceSupportInteractionDate; Subscription.supportInteractionDate; Subscription.upgradeInteractionDate; Subscription.deviceInteractionItemCount; UpdateSubscriptionEvent.eventCategory; UpdateCustomerProblemEvent.eventCategory; DeviceHeartbeatEvent.eventCategory; DeviceActivatedEvent.eventCategory; AssignedProductEvent.eventCategory; CustomerUsageSummaryEvent.eventCategory; UpdateAssignedBillingOfferEvent.eventCategory; Customer.computedCustomerValue; Customer.longevity; CustomerBillSpec.billAmountAverage; Customer.monetaryValue; Customer.callFrequency; Customer.pastDueRisk; Customer.paymentRejectionRisk; Customer.disputeRisk; Customer.collectionRisk; CustomerInteractionItem.inferredMotivations; Subscription.isAlive; Subscription.computedCommitmentEndDate; AssignedBillingOffer.isAlive; Product.is Alive; CustomerBill.isFirstBill; CustomerBill.billPaid; CustomerBill.abnormalBillIncrease; CustomerBill.abnormalRateIncrease; CustomerBillSpec.recentBills; CustomerBillSpec.recentCharges; CustomerBill.abnormalFeeCharges; CustomerBill.abnormalFeeAmount; OneTimeCharge.abnormalFee; UsageCharge.planOverage; CustomerBill.thirdPartyCharges; CustomerBill.thirdPartyCharge; CustomerBill.roamingCharges; CustomerBill.roamingCharge; CustomerBill.isPastDue; CustomerBill.proratedCharges; CustomerBill.proratedCharge; PaymentDetails.customerBill; PaymentDetails.isRejected; CustomerBill.paymentTimeliness; Customer.paymentPattern; CustomerAccount.isInCollections; CustomerAccount.lastCollectionActivityDate; CustomerInteraction.customers; CustomerInteractionItem.customers; CustomerInteractionItem.customerBills; CustomerInteractionItem.isBillPlanOverageInteraction; Customer.billPlanOverageInteractionCount; CustomerInteractionItem.isProratedChargeInteraction; Customer.proratedChargeInteractionCount; CustomerInteractionItem.isThirdPartyChargeInteraction; Customer.thirdPartyChargeInteractionCount; CustomerInteractionItem.isRoamingChargeInteraction; Customer.roamingChargeInteractionCount; Customerinteractiontem.isAttemptedPaymentInteraction; CustomerInteractionItem.isBillLookUpInteraction; CustomerInteractionitem.isPlanLookUpInteraction; CustomerInteractionItem.isPlanShoppingInteraction; BusinessEvent.eventCategory; CustomerInteractionItem.eventCategory; MissedPaymentEvent.eventCategory; AccountPaymentEvent.eventCategory; BillSentEvent.eventCategory; ChargeDisputeEvent.eventCategory; CustomerInteractionItemEvent.eventCategory; UpdateIndividualEvent.eventCategory; UpdateOrganizationEvent.eventCategory; UpdateContactEvent.eventCategory; UpdateCustomerEvent.eventCategory; NewCustomerAccountEvent.eventCategory; AccountCollectionsEvent.eventCategory; NewCustomerBillSpecEvent.eventCategory; UpdateCustomerBillSpecEvent.eventCategory; UpdatePayInstructionEvent.eventCategory; Subscription.recentBills; Subscription.recentCharges; Subscription.latestCharges; Subscription.planOveragePercentage; Subscription.abnormalUsageChargeIncrease; Subscription.usageChargeAverage; Subscription.abnormalThirdPartyChargeIncrease; Subscription.thirdPartyChargeAverage; Subscription.abnormalRoamingChargeIncrease; and Subscription.roamingChargeAverage.

Turning to FIG. 3B, a diagram of a unified business rule is shown. Unified rule 320' may encapsulate goal-oriented rule 320 described above with triggering information 330' selected from dependencies 330 of the goal-oriented rule. Rule engine 310', which may be a forward-chaining rule engine or a hybrid rule engine, may be configured to eagerly execute the unified rule in response to changes in data specified by the dependencies in a process described in further detail below.

Figure 4:
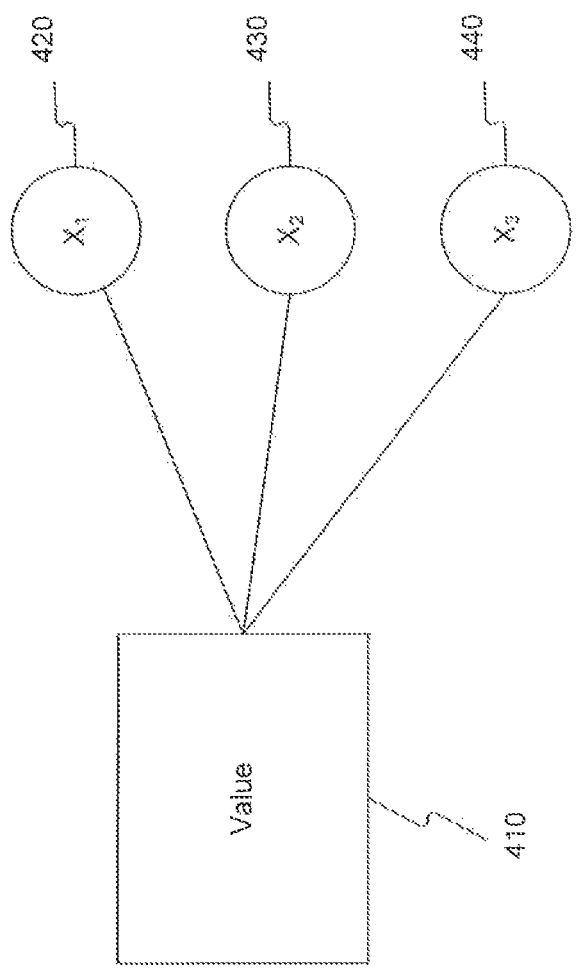
FIG. 4 is a diagram of a rule value with associated data dependencies in accordance with one implementation consistent with the present invention.

FIG. 4 is a diagram used to illustrate a rule value with associated data dependencies. A rule, such as rule 320, may include value 410 and associated data $X_1$ 420, $X_2$ 430, and $X_3$ 440. For example, a rule used to determine whether a customer is a "good" customer may depend on various data. For example, value 410 may determine a "good customer." Data $X_1$ 420, which is data on which value 410 depends, may include or reflect a customer's payment history, such as how often payments have been made, the amounts paid, the percentages of bills paid, disputes made, etc. Data $X_2$ 430 may include customer portfolio data, such as a customer's credit history, age, salary, services requested, disputes, etc. Data $X_3$ 440 data may include other data, such as a number of calls made to a call center, for example. The following example further illustrates a example of a rule with data dependencies.

In the following example, entity-attribute notation is used so that "A.x" refers to the value of attribute x of entity A. The entity name is capitalized, while the attribute name begins with a lower-case letter. Thus, customer credit worthiness is written as Customer.creditWorthiness and payment amount is written as Payment.amount.

R1: WHEN Payment.date is more than 10 days late
   THEN set Customer.creditWorthiness=POOR
R2: WHEN Payment.amount is less than amount due by more than 10%
   THEN
     IF Customer.creditWorthiness is GOOD
     THEN set Customer.creditWorthiness=FAIR
     ELSE set Customer.creditWorthiness=POOR As shown in this example, there are typically several such rules for a single entity-attribute pair (e.g., Customer.creditWorthiness), each corresponding to a different possible data change. The forward-chaining engine notices that Payment.date has changed and it determines that the rule R1 should be executed. It also detects when Payment.amount changes and in that case it determines that rule R2 should be executed. If both Payment.date and Payment.amount have changed, then the engine decides which rule should be executed first.

In forward-chaining systems, the order of rule execution may affect the computed value. In a large rule based system where there are many rules, it may become difficult to comprehend the effect of all the rules and the different orders in which they may be executed. The system may behave unpredictably in that the system may execute different rules in different orders, for example based on data changes. Counterbalancing this liability is a significant advantage to forward-chained rules, namely that they compute values immediately upon changes in data. As a result, when the time comes that the system needs a computed value, it need not incur the delay required to compute the value, because it has already been computed.

In contrast, a goal-driven (backward-chained) rule calculates a value not on the basis of a data change, but rather on demand (by another rule or by another part of the system), using the data values available at the time the rule is executed. Goal-driven rules are typically invoked not in response to a data change but in response to a request for a value. For these reasons, it may be advantageous to transform data-driven rules into a single rule that looks like a goal-driven rule, but which may be run eagerly.

Figure 5:
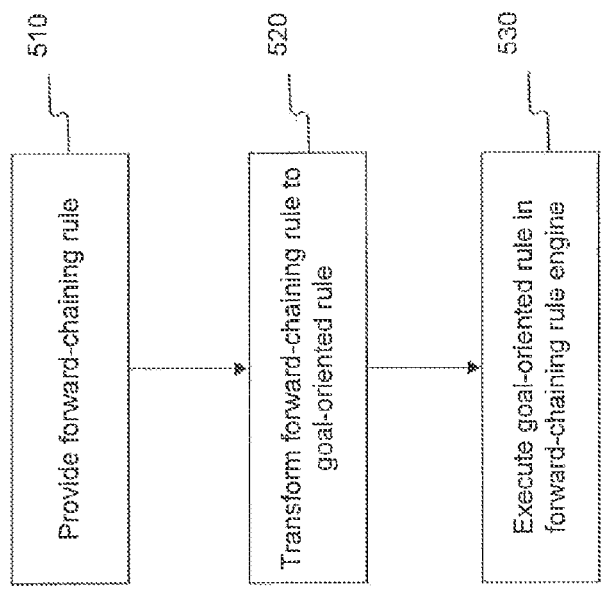
FIG. 5 is an exemplary process for transforming and executing a rule in accordance with one implementation consistent with the present invention.

FIG. 5 is a flow chart of an exemplary process for transforming and executing a rule in accordance with one implementation consistent with the present invention. As shown in FIG. 5, forward-chaining rule(s), such as the rules described above, may be provided (e.g., by a user or a system) (step 510). The forward-chaining rule(s) are transformed into goal-oriented rules (step 520). As an example, consider that the above data-driven rule example may be rewritten as a single backward-chained or goal-oriented rule, as follows:

R3: TO COMPUTE Customer.creditWorthiness DO:
   set Payment=Customer.paymentHistory.mostRecent
   IF Payment.date is more than 10 days late
   THEN set Customer.creditWorthiness=POOR
   ELSE
     set CurrentWorthiness=Customer.creditWorthiness
     IF currentWorthiness is GOOD
     THEN
       IF Payment.amount is 1% to 10% less than amount due
       THEN set Customer.creditWorthiness=FAIR
       ELSE IF Payment.amount is >10% less than amount due
       THEN set Customer.creditWorthiness=POOR
     ELSE IF currentWorthiness is FAIR
     THEN
       IF Payment.date is on time AND Payment.amount>=amount due
       THEN set Customer.creditWorthiness=GOOD
       ELSE IF Payment.amount is >10% less than amount due
       THEN set Customer.creditWorthiness=POOR
     ELSE IF currentWorthiness is POOR
     THEN
       IF Payment.date is on time AND Payment.amount>=amount due
       THEN set Customer.creditWorthiness=GOOD
       ELSE IF Payment.amount is 1% to 10% less than amount due
       THEN set Customer.creditWorthiness=FAIR The goal-oriented rule may be executed in a forward-chaining rule engine (step 530). For example, the above rule may be executed when Payment.amount changes. The rule makes use of all the relevant data, and covers cases not addressed by R1 and R2. The identification of information affecting Customer.creditWorthiness is limited to one rule instead of being distributed across many rules. Moreover, the rule explicitly specifies the order in which the different clauses are to be evaluated. There is no guessing about which part is evaluated first. The rule author may explicitly choose when each part of the computation is to be performed.

Accordingly, there are advantages and disadvantages to both data-driven and goal-driven rules. Methods and systems consistent with aspects of the present invention provide for:

(1) Transforming an application written with data-driven rules into a functionally equivalent application consisting of invertible goal-driven rules, where "invertible" means that the rule may be executed conventionally (on demand, backward-chained) or in response to the same data changes as the original data-driven (forward-chained) rules; and (2) Developing an application without any data-driven rules at all, using invertible goal-driven rules that can be executed either on-demand or in response to data changes as required by the application.

Figure 6:
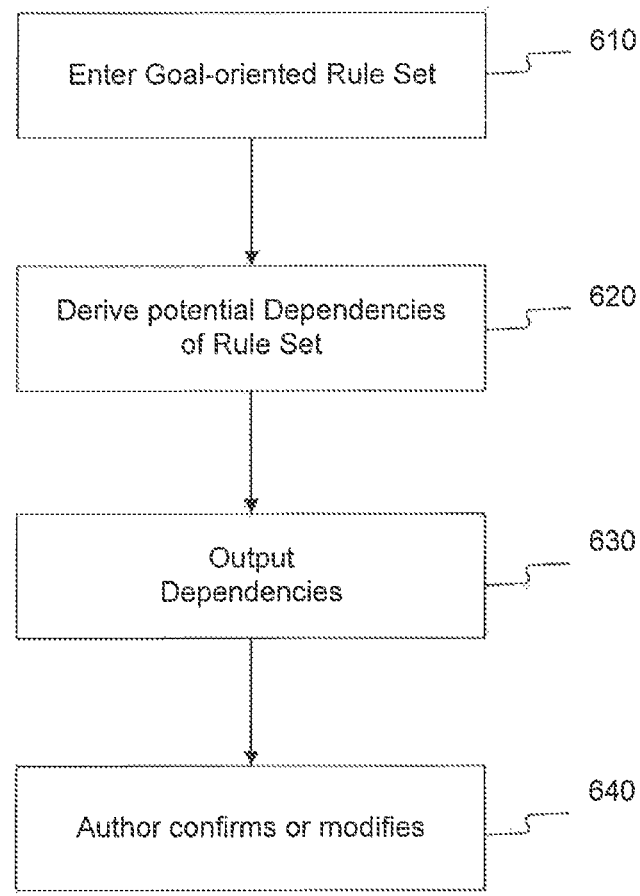
FIG. 6 is an exemplary process for authoring a rule in accordance with one implementation consistent with the present invention.

A rule author may therefore use invertible goal-driven rules to achieve the predictability and comprehensibility of goal-driven rules, while retaining the responsiveness of data-driven rules. FIG. 6 is a flowchart of an exemplary process for authoring a rule in accordance with one implementation consistent with the present invention. As shown in FIG. 6, an author may enter a goal-oriented rule set (step 610), for example using a graphical user interface, a text editor, or an eclipse-based syntax directed editor, or other authoring system. The system may derive potential dependencies of the rule set (step 620), as described in more detail below with respect to "Goal-Driven Rules." In some examples, the rule set author may specify the dependencies of the rule set. Next, the system outputs the dependencies (step 630), and the author confirms or modifies the dependencies (step 640).

Rule Information Model

Rules may be grounded in an information model, i.e., a formal representation of entities that may include their properties, relationships and the operations or rules that can be performed on the entities. Rules are formulated as statements in a machine executable language that operates on an externally defined information model. This grounding allows rules to be viewed as specifications for computing certain values on the basis of other values, i.e., as functional relationships. For example, a system may compute a customer's "value" as "good" or "improving" on the basis of other values, such as the customer's payment history or the timeliness of the customer's most recent payment.

The syntax of the rule language is not important. Nor is the implementation of the information model relevant to the mechanism described herein; it does, however, consist of entities, with attributes and relations to other entities. For example, in R1 and R2, the triggering "entity" is "payment" The "customer" is another entity.

With this basic capability, a unique location (e.g., a file or directory) name (i.e., a path) may start from an entity and traverse relations to a target attribute. For example, Customer.paymentHistory.mostRecent is a path with two attributes: paymentHistory and mostRecent. Thus, the system may identify a customer's payment history, and most recent payment.

Inverse relations—when the order of the attributes in the relation is switched—may also exist, so that any path may be traversed bi-directionally. Thus, for example, given a payment in a payment history, the system may identify the customer who made the payment.

The language may or may not have an explicit syntax for specifying paths (such as the dot-notation we are using here), but it is able to express this composition of relationships in some syntactic form.

Goal-Driven Rules

A goal-driven rule produced in accordance with methods and systems consistent with aspects of the present invention may correspond to a single attribute of a single entity. This entity-attribute pair is called the subject of the goal-driven rule. Thus, there might be a goal-driven rule for Customer.creditWorthiness, and another goal-driven rule for Customer.productInterest. The body of the rule will typically refer to other paths. For example, rule R3 (above) refers to the following paths:

Customer.paymentHistory.mostRecent.date
Customer.paymentHistory.mostRecent.dueDate
Customer.paymentHistory.mostRecent.amount
Customer.paymentHistory.mostRecent.amountDue All of the referenced paths are related to the subject entity—that is, they are reachable from the subject when the system traverses the relations in the information model in either forward or inverse direction (or a mixture of both). These other paths—the other items in the information model that are referenced in the body of the goal-driven rule—are the dependencies of the rule. This is a concept that may be used to execute the rule in a forward-chaining manner, when the values of any of these dependencies have changed.

The dependencies of a goal-driven rule are identified by analyzing the body of the rule. For example, if the rule language includes standard procedural programming expressions, then any term that occurs in a conditional expression or on the right-hand side of an assignment expression potentially qualifies as a dependency. For example: in rule R3 for Customer.creditWorthiness, Payment.amount potentially qualifies as a dependency. More generally, any path expression occurring in the goal-driven rule is a dependency if and only if it contributes to the computation of the value of the subject entity-attribute pair.

Transforming Data-Driven Rules

Once grounded in the information model, a data-driven rule may be viewed in the following expression:

IF a certain data item CHANGES
THEN UPDATE certain other data items

The "certain data" that changes is called the subject of the data-driven rule. Regardless of how complex the consequent of the data-driven rule is, if the application is grounded in an information model, then the results of the rule are reflected in updates to the information model. Otherwise, the rule is not doing anything.

With this understanding of the substance of data-driven rule, the internal logic of a data-driven rule is reduced to:

(1) Identifying the items that are updated (i.e., the update set); and (2) Updating those items in the appropriate manner.

Each item in the update set is an entity-attribute pair, such as Customer.creditWorthiness. The first step in replacing the data-driven rules is to provide each item in the update set with its own goal-driven rule.

For example, in rules R1 and R2 above, Customer.creditWorthiness is identified as an item to be updated, so a goal-driven rule is created for it, such as the rule R3 given above. Since the goal-driven rules are intended to be comprehensive, one rule is created for each entity-attribute pair. The goal-driven rule encapsulates the complete business logic for the concept.

Thus, for example, R3 represents Customer.creditWorthiness as it is updated in both R1 and R2. The logic in R3, however, is not necessarily a direct reflection of the logic in the data-driven rules; it is, rather, a formal definition of the business concept itself. Since the data-driven rules were written to capture aspects of the business concept, it is likely that the resulting goal-driven rule will encapsulate the relevant logic of the data-driven rules, and the rule author is free to borrow code from the data driven rules in writing the goal-driven rules, but this is not required.

Having moved the update logic into goal-driven rules, the logic remaining in the data-driven rule is item (1) above, namely identifying the specific items that are updated. The update set plays a role with respect to the data-driven rules that is analogous to the role of the dependencies for goal-driven rules. The items in the update set are path expressions that are related to the data-driven rule's subject entity, which is the entity of the entity-attribute pair whose change in value triggers the data-driven rule. The paths in the update set are reachable from the triggering subject by traversing the relations in the information model in either forward or inverse direction (or a mixture of both).

For example, in R1 and R2, the triggering entity is Payment, and the update set consists of Customer.creditWorthiness. The Customer entity is reached from the Payment via the attribute Payment.customer. Thus, the update set actually contains Payment.customer.creditWorthiness (this notation is elided for ease of reading).

In more complex cases, some attributes in the information model may not be single-valued, and the data-driven rule may use complex procedural, functional, or other formal expressions in order to identify a particular value from among the multiple values of an attribute. For example, in the following rule, which applies a payment with unspecified invoice to as many open invoices as the payment will cover, the attribute openInvoices is multi-valued:

R4: WHEN Payment.invoiceId==null
    THEN
        set amountLeft=Payment.amount
        FOR Invoice in Payment.customer.openInvoices DO:
            set amountToApply=min(Invoice.amountDue, amountLeft)
            Invoice.amountDue=Invoice.amountDue−amountToApply
            amountLeft=amountLeft-amountToApply
            IF amountLeft==0
            THEN break The update set includes the path Payment.customer.openInvoices.amountDue, but not all invoices for the customer will necessarily have their amountDue attribute updated, since the Payment.amount may not cover all of the open invoices.

In such cases, the update set includes an expression defining which values of the path should be updated. For R4, this is the largest set of open invoices taken in their natural sort order (e.g., sorted by invoice date) such that the sum of their amountDue attributes does not exceed Payment.amount. The data-driven rule already includes such an expression since it has been written to perform the desired updates. The information is extracted from the data-driven rule and placed into the definition of the update set. For example, the update set for R4 would consist of the single item Payment.customer.openInvoices.amountDue annotated with the expression set amountLeft=Payment.amount
    FOR EACH DO:
        set amountToApply=min(this, amountLeft)
        this=this−amountToApply
        amountLeft=amountLeft-amountToApply
        IF amountLeft==0
        THEN break or a functionally equivalent expression, such as "the largest set of open invoices taken in their natural sort order such that the sum of their amountDue attributes does not exceed Payment.amount."

Making the Goal-Driven Rules Invertible

The next step is to annotate the resulting goal-driven rules with triggering information (for example, in FIG. 3B, triggering information 330 ') that can he used to execute the goal-driven rules in response to data changes. The triggers 330' will be selected from the dependencies (in FIG. 3B, dependency clause 330) of the goal-driven rule (in FIG. 3B, rule 320). because those are the values that contribute to the computation performed by the rule.

It may be that the application developer does not wish all of the dependencies 330 to act as forward-chaining triggers 330' for the rule (in FIG. 3B, unified rule 320'). For example, rule R3 refers to Customer.paymentHistory.mostRecent.dueDate but this value is unlikely to change independently of Customer.paymentHistory.mostRecent.paymentAmount, so the rule author might not want to use it as a trigger for the rule.

If the application developer is working from a set of data-driven rules, which are being transformed by this method into invertible goal-driven rules, then the selection of dependencies 330 to act as triggers 330' for the goal-driven rule 320 follows from the previous steps of the method. Suppose the subject entity-attribute pair of the goal-driven rule is A.x. Let $R_1 \ldots R_n$ be the data-driven rules whose update set includes A.x. In other words, these are the data-driven rules that cause updates to A.x. Let $B_1.y_1 \ldots B_1.y_n$ be the subject (i. e, triggering) entity-attribute pairs of these data-driven rules. Then $B_1.y_1 \ldots B_n.y_n$, are precisely the entity-attribute pairs that the application developer wants to trigger re-computation of A.x.

Each $B_i.y_i$ (where i=1 ... n ) is reformulated as a path from A (using forward and; or inverse relations) so that it is meaningful in the context of the goal-driven rule for A.x. Since the goal-driven rule for A.x is comprehensive as a definition of the business concept represented by A.x, the reformulated $B_1.y_1 B_n.y_n$ should be among the dependencies 330 of the goal-driven rule for A.x, and these are the dependencies 330 that should act as triggers 330', The identification of triggering dependencies 330'for the goal-driven rule 320 requires another step. Recall that in the update set of each $B_i.y_i$ (where i=1 ... n), the path A.x, is actually formulated as a path from $B_i$ using a mixture of forward and inverse attributes. As explained above, if some of these attributes are multi-valued, then the update set for $B_1.,y_1$ (that is, for its data-driven rule) includes an expression defining which of the resulting value(s) for A are to have their x-attribute updated, In defining the triggers 330' for the goal-driven rule for A.x, these same expressions are included in the trigger list in order to define the specific values of A that should be updated given a change to $B_1.y_1$.

For example, in a goal-driven rule for Invoice.amountDue, one of the triggers 330' will be Invoice.eustomer,paymentumount because R4, a data-driven rule for Payment.amount, includes ayment.customer.openinvoices,amountDue in its update set, Because openinvoices is a multi-valued attribute, it does not necessarily follow that any payment will result in an update to any invoice's amount due. Which invoices are updated depends on the payment amount and the cumulative amount due for all the open invoices. Therefore, the Payment.amount trigger 330' requires an expression identifying the specific invoices to be updated, Such an expression was already formulated in the update list for R4, and we use it here to annotate the Payment. amount trigger 330'.

If the application developer has skipped the development of data-driven rules and instead started directly with goal-driven rules using this method, then effectively the same process is followed but with some of the steps omitted. In this case, the selection of forward-chaining triggers 330' for the goal-driven rule 320 follows from the application requirements: the developer intends the application to exhibit a set of data-driven behaviors, and these data-driven behaviors define the triggers 330' for the goal-driven rule 320. Just as in the case where data-driven rules were initially written, the trigger list specifies each trigger 330' as a path from A (using forward and/or inverse attributes). The inverse of this path (that is, the same path but traversed in reverse order, from the trigger to A) then identifies the entity to be updated in terms of the trigger 330'. If some of the attributes along this inverse path are multi-valued, then an expression is provided to define which of the resulting values of A should have their x-attribute updated, given a change to the trigger 330'.

The goal-driven rule 320 may now be annotated with a triggered-by list, which identifies those dependencies 330 that should act as triggers 330' for the rule 320'. Items in the triggered-by list are paths referenced in the rule body, such that a change to the value of the path should trigger execution of the goal-driven rule.

Once this is done, the data-driven rules have effectively disappeared. Their content has been absorbed into the annotated goal-driven rules. By virtue of the annotations, the goal-driven rules are now invertible, meaning they may be executed in a forward-chaining manner, triggered by the relevant data changes.

Triggering the Goal-Driven Rules at Run-Time

At run time, when a particular entity's attribute changes value and that attribute is in a goal-driven rule's trigger list, a subject population for the trigger is computed. This is the set of values of the goal-driven rule's subject entity for which the rule is executed in response to the change. The subject population consists of all values of the subject entity that are dependent on the changed entity-attribute pair.

The subject population is computed by traversing the inverse of the path that defines the trigger. If there are multi-valued attributes along this path, the qualifying expression included in the definition of the trigger is applied to select the desired values. In this manner, starting from the changed entity, the dependency path is traversed backwards to reach one or more values for the rule's subject. This set of values is the subject population. The rule is then executed for each instance in the subject population. The rule is thereby executed in a forward chaining manner, since its execution has been triggered by the data change to the triggering entity-attribute.

Backward Chaining within a Forward-Chaining Engine

Some forward chaining engines provide a partial backward chaining capability that assists in establishing selected antecedents for a data-driven rule. This capability is different from the method described herein because the resulting rules are still subject to the disadvantages data-driven rules.

Simulated Forward Chaining within a Backward-Chaining System

Backward chaining languages, such as Prolog, may be used in a procedural manner whereby a goal (the consequent) represents a high-level procedure and the subgoals (the antecedents) represent subroutines. Within this style, it is possible to simulate a simple form of forward chaining by making the high-level procedures correspond to events, so that the subroutines are then performed in response to events.

This style of writing nominally backward-chained rules is unrelated to the methods and systems described herein, in which backward-chained rules really are goal-driven. Rather than simulating forward chaining by treating subgoals as subroutines, the methods and systems described herein implement forward chaining by inverting the goal-driven rules.

Hybrid Forward-Backward Reasoning Engines

Some rule engines, such as the Jena engine, are hybrid forward-backward reasoners. While these reasoners can perform both forward and backward chaining, they typically do so on different rule sets: forward chaining on forward rules, backward chaining on backward rules. Thus, such hybrid reasoners do not provide the inversion capability described herein, and thus do not allow the application developer to realize the benefits of both types of reasoning while avoiding the pitfalls of data-driven rules.

Direction-Neutral Rule Languages

Some languages, such as the Semantic Web Rule Language (SWRL), are considered neutral with respect to the direction in which rules can be run. This is, however, purely a syntactic device, indicating that the semantics of the language are left up to the language implementer. Such languages do not provide any explicit means of inverting goal-driven rules, and are thus not bi-directional.

Rule based systems allow the abstraction of business logic from the enclosing execution framework. Sometimes it is necessary to execute these rules in an eager, forward-chaining manner, where the rules are triggered by (re)evaluating their antecedents each time any data in the rule set changes. However, the form of expression of existing forward-chaining rule systems leads to inscrutable rule sets with unfathomable dependencies for non-trivial business rules.

Methods and systems consistent with certain aspects of the present invention enable the business logic that defines a business concept to be expressed clearly and concisely in a goal-driven form and yet still be executed using a forward-chaining engine. Such methods and systems provide a way to transform a system written in terms of data-driven (forward chaining) rules into one consisting only of invertible goal-driven rules, in such a way that the invertible goal-driven rules, when run in a forward chaining manner, provide the data-driven behavior originally expressed in the data-driven rules, while still providing the comprehensiveness and predictability of goal-driven rules. They also provide a way to express the rules directly in goal driven form and execute them eagerly to achieve the benefits of forward chained rules while retaining the benefits of backward chained rules.

Additionally, methods and systems consistent with certain aspects of the present invention may separate the fact that a data change has occurred from the details of the change (for example, the detail that one data item now has a greater value than another data item). In a conventional forward-chaining system, the forward-chaining (data-driven) rules combine these two aspects in the conditions of the rules. This combination, while contributing to the apparent ease of understanding each individual data-driven rule (because each rule may refer only to a subset of the possible changes that can occur), is a primary cause of the resulting complexity of the set of rules taken as a whole (because a large set of interrelated rules may be needed in order to capture a business concept). A goal-driven rule consistent with aspects of the present invention may include the details of the possible data changes in the business logic contained in the body of the rule, but the triggers that serve to invoke the rule occur in response to the fact of a data change, regardless of the content of the change. This separation allows the goal-driven rule to collect all of the relevant business logic in a single rule, unlike conventional data-driven rules, while also exhibiting the required data-driven behavior.

Figure 7:
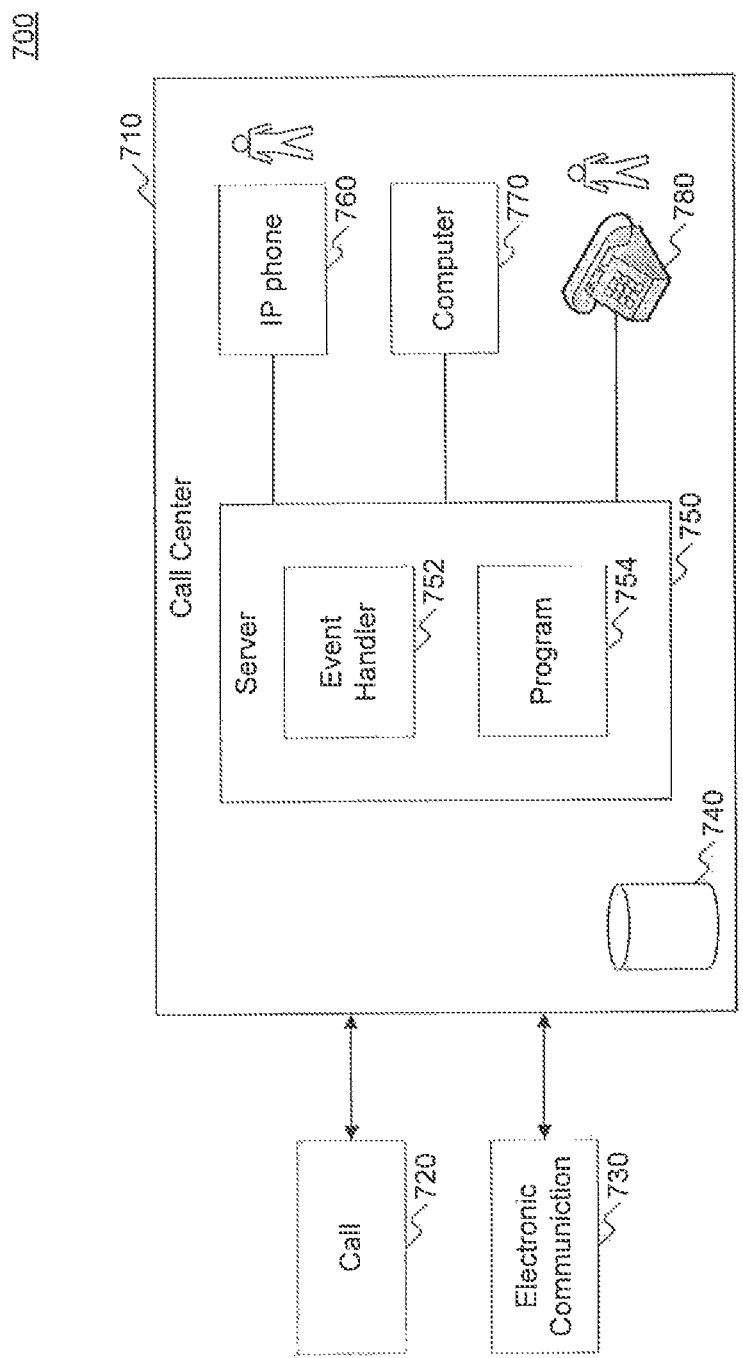
FIG. 7 is diagram of a system for handling event data in accordance with aspects of the present invention.

FIG. 7 is a block diagram of an exemplary system for handling event data in which systems and methods consistent with aspects of the present invention may be implemented. The components and arrangement of FIG. 7, however, may be varied within principles of the present invention.

As shown in FIG. 7, system 700 includes call center 710. Call center 710 may receive event data such as a call 720 or an electronic communication 730. For example, a customer may contact call center 710 via call 720 or electronic communication 730 to inquire about a bill. Electronic communication 730 may include, for example, an e-mail, a text message, a voice-over IP communication, an audio-visual communication, or a notification from another computer system (not pictured), such as a notification that a bill was delivered to a customer.

Similarly, call center 710 may output event data such as call 720 or electronic communication 730. For example, call center 710 may call a customer to preempt a question about a bill, or may send electronic communication 730 (e.g., an email) to update a customer about the status of a bill. In certain examples, any customer activity (e.g., payment of a bill, change of address, etc.) may result in an electronic communication 730 to call center 710.

As shown in FIG. 7, call center 710 includes data store 740, server 750, IP phone 760, computer 770, and telephone 780. Data store 740 may comprise one or more databases that store information and are accessed and/or managed through system 100. By way of example, data store 740 may be an Oracle™ database, a Sybase™ database, or other relational database system. Data store 740 may store, for example, data and information related to call 720, electronic communication 730, events, notifications, customer information, etc. Systems and methods of the present invention, however, are not limited to separate databases or even to the use of a database.

Server 750 may include event handler 752 and program 754. Event handler 752 may monitor and handle events, such as call 720 or electronic communication 730. For example, event handler 752 may monitor customer activity, such as any changes in customer data, changes in customer environment either initiated by a company or initiated by a customer, changes in the configuration of a product or service, changes in the patterns of use of a product or service, or communication between the company and the customer. Program 754 may comprise a software application configured to work with event handler 752. In one example, program 754 may comprise a forward-chained rule engine to process a rule. Server 150 may also include other programs that perform other functions and processes, such as programs that provide communication support and customer activity monitoring.

IP Phone 760 may comprise a voice over Internet Protocol (VoIP) system. Computer 770 may comprise one or more workstations, personal computers, laptops, or other computers. Telephone 780 may comprise one or more standard telephones.

Figure 8:
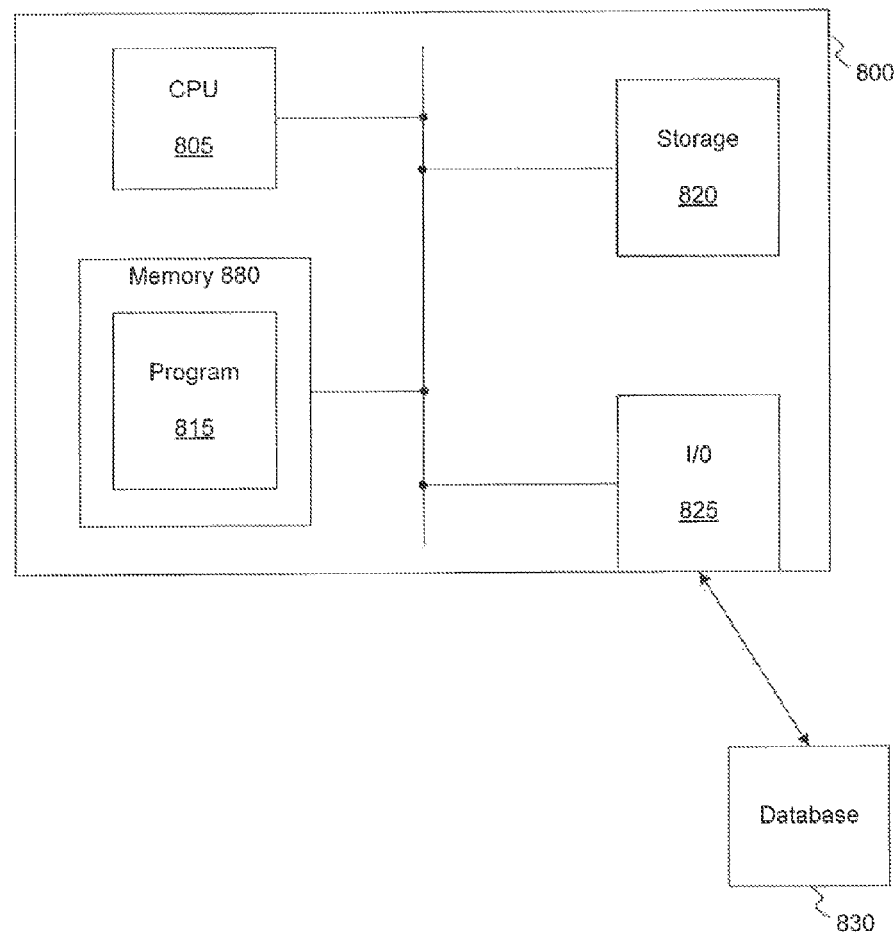
FIG. 8 is a diagram of a rule execution system in accordance with aspects of the present invention.

FIG. 8 is a block diagram of an exemplary business rule system in which systems and methods consistent with aspects of the present invention may be implemented. The components and arrangement of FIG. 8, however, may be varied.

Data processing or computing system 800 includes a number of components, such as a central processing unit (CPU) 805, a memory 880, an input/output (I/O) device(s) 825, a storage 820, and a data store 830. System 800 can be implemented in various ways. For example, an integrated platform (such as an IP Phone, workstation, personal computer, laptop, etc.) may comprise CPU 805, memory 880, nonvolatile storage 820, and I/O devices 825. In such a configuration, components 805, 880, 820, and 825 may connect through a local bus interface and access data store 830 (shown implemented as a separate database system) via an external connection. This connection may be implemented through a direct communication link, a local area network (LAN), a wide area network (WAN) and/or other suitable connections. System 800 may be standalone or it may be part of a subsystem, which may, in turn, be part of a larger system.

CPU 805 may be one or more known processing devices, such as a microprocessor from the Core™ family manufactured by Intel corporation. Memory 880 may be one or more storage devices configured to store information used by CPU 805 to perform certain functions related to aspects of the present invention. Storage 820 may be a volatile or non-volatile, magnetic, semiconductor, tape, optical, removable, nonremovable, or other type of storage device or computer-readable medium. In one example consistent with the present invention, memory 880 includes one or more programs or subprograms 815 loaded from storage 820 or elsewhere that, when executed by CPU 805, perform various procedures, operations, or processes consistent with the present invention. For example, memory 880 may include one or more goal-driven rules, a set of data-driven rules, a rule information model, an authoring program for transforming data-driven rules and making goal-driven rules invertible, and a program for triggering goal-driven rules at run-time in response to data changes. Memory 880 may also include other programs that perform other functions and processes, such as programs that provide customer support, communication support, Internet access, etc.

Methods, systems, and articles of manufacture consistent with the present invention are not limited to separate programs or computers configured to perform dedicated tasks. For example, memory 880 may be configured with a program 815 that performs several functions when executed by CPU 805. For example, memory 880 may include a single program 815 that executes a goal-driven rule with a forward-chaining rule engine. Moreover, CPU 805 may execute one or more programs located remotely from system 800. For example, system 800 may access one or more remote programs that, when executed, perform functions related to aspects of the present invention.

Memory 880 may also be configured with an operating system (not shown) that performs several functions well known in the art when executed by CPU 805. By way of example, the operating system may be Microsoft Windows™, Unix™, Linux™, or other operating system.

I/O device(s) 825 may comprise one or more input/output devices that allow data to be received and/or transmitted by system 800. For example, I/O device 825 may include one or more input devices, such as a keyboard, touch screen, mouse, and the like, that enable data to be input from a user, such as payment amounts, payment dates, customer history, or customer credit worthiness. Further, I/O device 825 may include one or more output devices, such as a display screen, CRT monitor, LCD monitor, plasma display, printer, speaker devices, and the like, that enable data to be output or presented to a user. I/O device 825 may also include one or more digital and/or analog communication input/output devices that allow computing system 800 to communicate with other machines and devices, such as a scanner or a telephone. System 800 may input data from external machines and devices and output data to external machines and devices via I/O device 825. The configuration and number of input and/or output devices incorporated in I/O device 825 may vary.

System 800 may also be communicatively connected to a data store 830. data store 830 may comprise one or more databases that store information and are accessed and/or managed through system 800. By way of example, data store 830 may be an Oracle™ database, a Sybase™ database, or other relational database. Data store 830 may include, for example, data and information related to customer history, customer preferences, business policies, business information, etc. Systems and methods of the present invention, however, are not limited to separate databases or even to the use of a database.

Other aspects of the disclosure will be apparent to those skilled in the art from consideration of the specification. It is intended that the specification and examples be considered as exemplary only.

What is claimed is:

1. A computer-implemented method for authoring business rules, the method comprising:
    receiving a goal-driven rule created with an authoring system; and
    transforming the goal-driven rule into a rule annotated with triggering information executable using a rule engine, wherein the triggering information specifies one or more paths referenced in the body of the goal-driven rule.

2. The computer-implemented method of claim 1, wherein the authoring system includes a text editor.

3. The computer-implemented method of claim 1, wherein a business measure is determined upon execution of the annotated rule.

4. The computer-implemented method of claim 1, further comprising:
    initiating communication with a customer based on execution of the annotated rule.

5. The computer-implemented method of claim 1, further comprising:
    generating the triggering information by traversing the one or more paths in tho forward and inverse direction,
    wherein the triggering information defines, when an attribute associated with the inverse direction is multivalued, an attribute of a subject associated with the one or more paths to be updated in response to detecting the changed value of the one or more paths, and
    wherein the triggering information triggers the rule engine to execute the annotated rule in response to a change to a value of the one or more paths.

6. The computer-implemented method of claim 1, further comprising:
    receiving annotations via the authoring system.

7. The computer-implemented method of claim 1, wherein the rule engine is a forward-chaining rule engine.

8. The computer-implemented method of claim 1, wherein the rule engine is a hybrid rule engine.

9. The computer-implemented method of claim 7, further comprising:
    analyzing one or more terms in the body of the goal-driven rule; and
    determining one or more dependencies of the goal-driven rule based on the analyzed terms.

10. The computer-implemented method of claim 7, further comprising:
    analyzing one or more dependencies of the goal-driven rule; and
    deriving one or more triggering conditions for the forward-chaining rule based on the analyzed dependencies.

11. The computer-implemented method of claim 8, further comprising:
    analyzing one or more dependencies of the goal-driven rule; and
    deriving one or more triggering conditions for the hybrid rule based on the analyzed dependencies.

12. A non-transitory, computer-readable medium storing instructions for execution by a processor to perform a method for authoring business rules, the method comprising:
    receiving a goal-driven rule created with an authoring system; and
    transforming the goal-driven rule into a rule annotated with triggering information executable using a rule engine, wherein the triggering information specifies one or more paths referenced in the body of the goal-driven rule.

13. The non-transitory, computer-readable medium of claim 12, wherein
    a business measure is determined upon execution of the annotated rule.

14. The non-transitory, computer-readable medium of claim 12, wherein the method further comprises:
    initiating communication with a customer based on execution of the annotated rule.

15. The non-transitory, computer-readable medium of claim 12, wherein the rule engine is a forward-chaining rule engine.

16. The non-transitory, computer-readable medium of claim 12, wherein the rule engine is a hybrid rule engine.

17. The non-transitory, computer-readable medium of claim 15, wherein the method further comprises:
    analyzing one or more terms in the body of the goal-driven rule; and
    determining one or more dependencies of the goal-driven rule based on the analyzed terms.

18. The non-transitory, computer-readable medium of claim 15, wherein the method further comprises:
    analyzing one or more dependencies of the goal-driven rule; and
    deriving one or more triggering conditions for the forward-chaining rule based on the analyzed dependencies.

19. The non-transitory, computer-readable medium of claim 15, wherein the method further comprises:
    analyzing one or more dependencies of the goal-driven rule; and
    deriving one or more triggering conditions for the hybrid rule based on the analyzed dependencies.

20. A system for authoring business rules, comprising:
    a memory storing instructions; and
    a processor configured to execute the instructions to:
        receive a goal-driven rule created with an authoring system; and
        transform the goal-driven rule into a rule annotated with triggering information executable using a rule engine, wherein the triggering information specifies one or more paths referenced in the body of the goal-driven rule.

* * * * *